Aug. 18, 1964   C. CAMPBELL   3,145,034
COMBINED CHECK AND ACCOUNT BOOK
Filed Jan. 18, 1961

INVENTOR.
CURTIS CAMPBELL
ATTORNEYS

United States Patent Office 3,145,034
Patented Aug. 18, 1964

3,145,034
COMBINED CHECK AND ACCOUNT BOOK
Curtis Campbell, 89 Lothrop St., Beverly, Mass.
Filed Jan. 18, 1961, Ser. No. 83,549
2 Claims. (Cl. 283—58)

My invention relates to combined check and account books, and particularly to an improved loose leaf checkbook comprising check forms and accounting forms for recording transactions affecting a checking account.

Conventional checkbooks are provided with stubs detachably secured to each check form, on which data pertaining to each check are recorded, and provision is made for recording deposits and adjusting the balance carried forward. When a statement of the account is received from the bank, it is a tedious task to peruse these stubs and reconcile them with the statement. In addition, the information on the stubs is not readily available for tax and budgeting purposes. Thus, such checkbooks are normally used in conjunction with account books by small business and professional men, and others of moderately involved affairs.

Numerous attempts have been made to simplify the mechanics of bookkeeping by combining the check and account books. However, so far as I am aware, these have been either awkward to use, or impractical, requiring multiple entries of the same transaction, excessive manipulation of the book, or failing to provide an adequate consolidated record. In accordance with my invention, I provide a combined check and account book which facilitates the keeping of current accounts at the time of drawing a check, and which provides a permanent accounting record.

Briefly, the combined check and account book of my invention comprises a loose leaf binder, in which two groups of sheets are secured. The first of these comprises a plurality of sheets formed in detachable sections printed in the form of blank checks, and the second comprises a plurality of account record sheets, printed on both sides, and punched at opposite edges so that either side can be inserted face-up opposite the current blank check form sheet. Preferably, the check form sheets are of a different width than the account record sheets, or are otherwise distinctively marked, to facilitate opening the book to the current sheet. In accordance with one specific embodiment of my invention, I further provide a colored, or otherwise visually distinguishable, spacer sheet which is punched along one edge for insertion between used and unused account record sheets.

My invention will best be understood by reference to the accompanying drawings, together with the following detailed description, of a preferred embodiment thereof.

In the drawings,

FIGURE 1 is a diagrammatic view of one embodiment of a combined check and account book of my invention, opened to display the current account record sheet; and FIGURE 2 is an end view of the book of FIG. 1 in closed position, showing the relative size and placement of the sheets.

Referring to FIG. 1, I have shown a combined check and account book comprising a loose leaf binder 1 of conventional construction, provided with two or more releasable prongs 2 to secure sheets which have been punched along one edge. The binder is opened to display a first group of sheets 3, each punched along one edge, as at 4, to receive the prongs 2. As shown, each sheet of the first group comprises a plurality of check forms such as 5, 6 and 7, which are made detachable by conventional means such as the lines of punched slits diagrammatically shown by dotted lines. Each check form is printed on one side in any desired fashion to comprise a blank check.

A second group of sheets 8, shown at the left in FIG. 1, comprises account record blanks, each printed on both sides with a form such as that shown, and punched along opposite edges, as at 9, 10, so that either side of each sheet can be placed face-up at the left side of the book. As will appear, this arrangement has the advantage that used account record sheets accumulate in serial order. However, the account record sheets could be placed at the right, and the check blank sheets at the left, in FIG. 1, if so desired, without departing from the scope of my invention.

As illustrated in FIG. 1, each account record sheet of the group 8 is conventionally ruled into rows and columns, and the columns designated with appropriate accounting indicia. For example, as shown, columns may be provided for the date of each transaction, the check numbers for use where the entry involves a check, a description of the deposit or check, the beginning balance and deposits, the amount of each check, and the resulting balance. The Description column is preferably subdivided as shown, so that deposits may be entered marginally offset from the check descriptions. In this manner, the nature of an entry can be determined at a glance. As will be obvious, the resulting balance may be formed opposite any entry by making the appropriate additions or subtractions of entries following the previous balance, and totals can be taken at the end of the sheet to check intermediate balances. The sheets 8 are preferably provided with a blank for the page number, at the top on ench side, for use in compiling a serially numbered permanent account book in a manner described in detail below.

Referring now to FIG. 2, the check blank sheets 3 are preferably made of different width than the account record sheets; for example, as shown, they may be made narrower by a sufficient margin so that the current account record sheet may be found at a glance, or by touch. The account record sheets may be divided into a used group 8b and an unused group 8a by a spacer sheet 11, which is colored or otherwise visually or tactually distinguished so that a fresh sheet can readily be found.

Having described the construction of the combined check and account book of my invention, its operation will next be described.

Initially, the book is prepared for use by inserting one of the group 8 of account record sheets in the binder opposite the group 3 of check blank sheets. The spacer sheet 11 is placed in the group of account record sheets just below the top sheet. As checks are written, they are entered on the account record sheet and detached, such a fresh supply of check blanks is always available opposite the current account record sheet. Deposits are also entered in the account record sheet as they occur, and resulting balances are formed when desired. The top of the first account record sheet is numbered 1, and when it is filled, it is removed from the binder, turned over, and the top of the other side becomes page 2.

When an account record sheet is filled on both sides, a fresh sheet is taken from the supply on the other side of the spacer sheet 11, and placed on top of the first sheet. Thus, a completed serially numbered account book is formed, which may be left in place, or removed from time to time and transferred to a separate binder.

While the precise size of my novel book is of secondary importance, it may be advantageously embodied in a standard 8½ x 11 ring binder, in which case a sheet of four checks would face each record sheet.

It will be apparent that I have described one embodiment of a compact and efficient combined check and account book, which is highly economical of form space and requires few entries in comparison with a book in which separate accounting stubs are provided for each check. However, while I have described only one embodiment of my invention in detail, many changes and variations will be apparent to those skilled in the art after reading my description, and such may obviously be made without departing from the scope of my invention.

Having thus described my invention, what I claim is:

1. A combined check and account book, comprising, in combination, a loose-leaf binder, a first plurality of sheets of predetermined width punched along one edge and inserted in said binder, said sheets each comprising a plurality of detachable check forms, a second plurality of sheets of width larger than said predetermined width punched along opposite edges so that said second sheets can each be inserted at either edge in said binder and being inserted in said binder adjacent said first sheets, each of said second plurality comprising an account record sheet provided on both sides with ruling and indicia for recording, whereby upon opening the book to the current account record sheet, it will be opposite a sheet of check forms.

2. The combined check and account book recited in claim 1, further comprising a distinctive spacer sheet punched at one side and inserted in said binder in such a position that upon opening the book to the current account record sheet, it will be opposite a sheet of check forms, and will be separated from unused sheets by said spacer sheet.

References Cited in the file of this patent

UNITED STATES PATENTS

| | | |
|---|---|---|
| 549,826 | Selden | Nov. 12, 1895 |
| 563,700 | White | July 7, 1896 |
| 1,074,833 | Browne | Oct. 7, 1913 |
| 1,172,010 | Cooke | Feb. 15, 1916 |
| 2,677,555 | McMillan et al. | May 4, 1954 |